(12) United States Patent
Fredriksson

(10) Patent No.: US 8,941,532 B2
(45) Date of Patent: Jan. 27, 2015

(54) PROBE SPACING ELEMENT

(71) Applicant: Rosemount Tank Radar AB, Goteborg (SE)

(72) Inventor: Hakan Fredriksson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 239 days.

(21) Appl. No.: 13/706,637

(22) Filed: Dec. 6, 2012

(65) Prior Publication Data

US 2014/0159944 A1    Jun. 12, 2014

(51) Int. Cl.
    *G01S 13/08*    (2006.01)

(52) U.S. Cl.
    CPC ...................................... *G01S 13/08* (2013.01)
    USPC .......................................................... 342/124

(58) Field of Classification Search
    CPC ....................................................... G01S 13/08
    USPC .......................................................... 342/124
    See application file for complete search history.

(56) References Cited

U.S. PATENT DOCUMENTS

| | | | |
|---|---|---|---|
| 2,375,084 | A | 5/1945 | Coroniti et al. |
| 5,532,687 | A | 7/1996 | Richardson et al. |
| 5,638,415 | A * | 6/1997 | Nafziger et al. ............. 376/260 |
| 7,392,699 | B2 | 7/2008 | Motzer et al. ................... 73/290 |
| 7,586,435 | B1 * | 9/2009 | Edvardsson ................. 342/124 |
| 8,018,373 | B2 * | 9/2011 | Edvardsson ................. 342/124 |
| 8,717,222 | B2 * | 5/2014 | Van Den Berg ................ 342/22 |
| 2004/0178064 | A1 | 9/2004 | Lorincz .................... 204/297.01 |
| 2007/0085729 | A1 * | 4/2007 | Edvardsson .................. 342/124 |
| 2008/0078244 | A1 | 4/2008 | Dietmeier |
| 2009/0211808 | A1 | 8/2009 | Falk et al. |
| 2010/0231438 | A1 * | 9/2010 | Ohlsson et al. .............. 342/124 |

(Continued)

FOREIGN PATENT DOCUMENTS

| | | |
|---|---|---|
| CA | 2 384 257 A1 | 10/2003 |
| DE | 19728280 A1 | 5/1998 |
| DE | 10 2004 032 965 A1 | 2/2006 |
| DE | 20 2008 007 989 U1 | 12/2009 |

(Continued)

OTHER PUBLICATIONS

Notification of transmittal of the International Search Report and the Written Opinion of the International Searching Authority, PCT/SE2013/000174, dated Apr. 1, 2014.

*Primary Examiner* — John B Sotomayor
(74) *Attorney, Agent, or Firm* — Westman, Champlin & Koehler, P.A.

(57) ABSTRACT

The present invention relates to a guided wave radar level gauge system for determining a filling level of a product contained in a tank. The level gauge system comprises a transceiver for transmitting and receiving electromagnetic signals, a probe extending into the tank and configured to guide the signals towards the surface and to guide reflected signals back to the transceiver, processing circuitry for determining the filing level based on the reflected signals, and a plurality of spacing elements arranged on the probe. Each spacing element comprises a shell structure having an ellipsoidal shape defining an ellipsoidal space, first and second shell openings at first and second locations of the shell, such that a passage through the shell openings defines a passage through the spherical space, wherein the probe extends through the passage, and a plurality of flow openings allowing fluid flow between the exterior and interior of the shell.

18 Claims, 7 Drawing Sheets

(56) References Cited

U.S. PATENT DOCUMENTS

2011/0109496 A1* 5/2011 Van Den Berg ............ 342/124
2014/0159944 A1* 6/2014 Fredriksson ................ 342/124

FOREIGN PATENT DOCUMENTS

DE  10 2011 009 385 A1  7/2012
WO  WO 2006/003082  1/2006

* cited by examiner

PROBE SPACING ELEMENT

FIELD OF THE INVENTION

The present invention relates generally to a guided wave radar level gauge for determining a filling level of a product contained in a tank, and in particular to such a gauge including a probe extending into the tank.

TECHNICAL BACKGROUND

Microwave level gauge, or radar level gauge (RLG), systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a guided wave transmission line.

The probe of a guided wave radar system may be a flexible probe such as a transmission line probe, a cable or a wire type probe.

A probe is generally arranged to extend vertically from the top of the tank towards the bottom of the tank. The probe may also be arranged in a still-pipe, which is a pipe or tube arranged within in the tank and in fluid connection with the inside of the tank. A still pipe may for example be preferable if the surface of the product is turbulent, the still pipe may then provide a calmer surface for level measurements.

Furthermore, if the probe is arranged in such a measurement pipe, it is important to ensure that the probe does not make contact with the walls of the tube, which may cause disturbances in the measurement. Therefore, the probe may for example be attached also to the bottom of the tank to prevent lateral movement of the probe within the pipe, thereby avoiding contact between the probe and the inner wall of the measurement pipe.

In some applications it may be desirable, or necessary, to arrange the probe in an inclined or curved measurement tube. For example, the location of the tank may prevent direct access to the roof of the tank, thereby requiring an inclined or curved pipe through which the probe must be arranged in order to gain access to the product to be gauged. The tank may also be formed so that there is no straight path from a transceiver of a guided wave radar system to the bottom of the tank.

However, it would not be possible to use a wire probe in an inclined or curved pipe without modifications as the wire probe would make contact with the inner wall of the pipe, thereby adversely affecting the signal propagation properties of the probe. In particular, a conductive element such as a metal pipe will give rise to reflections of the signal propagating on the probe if the probe is too close to the pipe.

A solution to this problem is suggested by U.S. Pat. No. 7,392,699 where a probe, here in the form of a rod, arranged in an inclined and/or curved pipe is provided with spacers for maintaining the probe in a fixed position in the center of the tube.

However, in the approach disclosed by U.S. Pat. No. 7,392,699, the probe is attached to the spacers, which in turn are attached to the walls of the tube. Such an arrangement is complicated both to install and to remove as the entire measurement tube must be disassembled to remove the probe.

SUMMARY OF THE INVENTION

In view of the above-mentioned and other drawbacks of the prior art, a general object of the present invention is to provide an improved guided wave radar level gauge system, and in particular a guided wave radar level gauge system enabling the use of a probe in an inclined or curved configuration.

According to a first aspect of the present invention, these and other objects are achieved through a guided wave radar level gauge system for determining a filling level of a product contained in a tank, which level gauge system comprises a transceiver for transmitting electromagnetic transmission signals and receiving reflected electromagnetic signals reflected at a surface of the product, a probe, connected to the transceiver, arranged to extend vertically into the tank and configured to guide the electromagnetic transmission signals towards the surface and to guide the reflected electromagnetic signals back to the transceiver, processing circuitry connected to the transceiver and configured to determine the filing level based on the received reflected electromagnetic signals, and a plurality of spacing elements arranged on the probe, each of the spacing elements comprising: a shell structure having a substantially ellipsoidal shape defining an ellipsoidal space, a first shell opening at a first location of the shell, a second shell opening at a second location, such that a passage through the first and second shell openings defines a passage through the spherical space, wherein the probe extends through the passage, and a plurality of flow openings allowing fluid flow between the exterior and interior of the shell.

In the context of the present application, the "probe" is a waveguide designed for guiding electromagnetic signals. Several types of probes, for example single-line (Goubau-type), and twin-line probes may be used. The probes may be essentially rigid or flexible and they may be made from metal, such as stainless steel, plastic, such as PTFE, or a combination thereof.

The "transceiver" may be one functional unit capable of transmitting and receiving electromagnetic signals, or may be a system comprising separate transmitter and receiver units.

The tank may be any container or vessel capable of containing a product, and may be metallic, or partly or completely non-metallic, open, semi-open, or closed.

In the present context, the shell of the spacing element should be understood to span a substantially ellipsoidal outer profile of the spacing element. The shell may be provided in one part or as a plurality of parts joined together so as to span an ellipsoidal space.

The present invention is based on the realization that it is possible to arrange a probe in an inclined or curved measurement pipe such that contact between the probe and the inner wall of the measurement pipe is prevented by using probe spacing elements arranged on the probe. It is further realized that a probe provided with probe spacing elements enables the arrangement of the probe on an inclined surface without making contact with the surface. Each probe spacing element comprises a substantially ellipsoidal hollow shell structure and a pair of openings for threading the probe through the spacing element. Accordingly, the probe can be maintained at a fixed distance from the inner wall of a pipe in which the probe is arranged by the probe spacing elements. Thereby, undesirable reflections of the signal propagating on the probe caused by a capacitive or conductive coupling between the pipe and the probe can be reduced or eliminated. The spacing element further comprises openings, in addition to the openings through which the probe is arranged, for allowing a fluid to flow through the spacing element. Thereby it is possible to allow the spacing elements to become submerged, enabling level gauging in situations where the level of the product is above the position of the spacing element.

Furthermore, the flow openings allow fluid communication between the exterior and interior of the spacing element so that the product may be in contact with the probe thereby facilitating accurate detection of the level of the surface.

An advantage of the probe spacing element according to the present invention is that the amount of material located close to the probe can be minimized, thereby reducing the electromagnetic influence that the spacing elements have on the probe, and consequently on the propagating properties of the electromagnetic signal. As any material located adjacent to the probe influences the propagation properties of the probe, it is desirable to avoid or reduce the amount of material located close to the probe. In the present spacing element, the amount of material adjacent to the probe is defined by thickness of the shell in the portions surrounding the openings for arranging the spacing element on the probe.

Additionally, the spacing element according to various embodiments of the invention may advantageously be used arranged on a free probe. A probe arranged in a tank may risk making contact with conducting structures in the tank, for example if the surface is turbulent so that the probe moves in the tank. As an example, a wire probe can be vertically aligned by attaching a weight to a lower portion of the probe. However, in case of movements of the product in the tank, such as during filling, the probe may be forced to move in the lateral direction, thereby risking making contact with other objects in the tank.

Furthermore, the spacing elements may advantageously be arranged adjacent to each other on the probe so that no intermediate portions of the probe are exposed.

In one embodiment of the invention, each of the spacing elements may further comprise a third shell opening at a third location of the shell and a fourth shell opening at a fourth location of the shell, such that a passage through the third and fourth shell openings defines a second passage through the ellipsoidal space, wherein the third and fourth shell openings are of a different diameter than the first and second shell openings. By providing a second pair of shell openings of a different diameter than the first pair of shell opening, the spacing element can be configured to be arranged on different types of probes with different diameters. Furthermore, by providing a spacing element having an ellipsoidal shape, the same spacing element can be configured to be arranged in pipes of different diameters.

According to one embodiment of the invention, the shell structure may have a substantially spherical shape defining a spherical space. Although many different ellipsoid configurations of the spacing element in principle are possible, a spherical element may be preferred in some applications.

In one embodiment of the invention, the first shell opening is arranged antipodal to the second shell opening, such that the passage through the spherical space defines a central axis of the spherical space. Antipodal points on a sphere are defined as two points opposite each other such that a line between the two points passes through the center of the sphere. Thereby, it can it can be ensured that the probe always has the same distance to the shell of the spacing element regardless of the orientation of the spacing element. Thus, the distance from the probe to an external object making contact with the spacing element is always constant.

Moreover, in an ellipsoidal spacing element, the first and second shell openings may be arranged opposite each other on a central axis of the ellipsoid.

Additionally, the third shell opening may be arranged antipodal or opposite to the fourth shell opening, such that said second passage defines a central axis of the spherical space.

Furthermore, shell openings located antipodal to each other may advantageously be of the same diameter. In that way, pairs of shell openings antipodal or opposite to each other may be configured so that the spacing element may be arranged on probes of different diameters.

In one embodiment of the invention, the shell is tapered towards each of the shell openings so that a portion of the shell adjacent to each of the shell openings is thinner than in portions distant from the shell openings. The electric influence of the spacing element on a signal propagating along the probe is proportional to the volume of mass located close to the probe, with a decreasing relation with increasing distance from the probe. Accordingly, it is desirable to configure the spacing element so that as little mass as possible is located adjacent to the probe. This can be achieved by configuring the spacing element with portions of the shell encircling the probe being gradually thinner closer to the probe. Thereby, the volume of mass adjacent to the probe can be reduced compared to a shell structure having a homogeneous thickness, while at the same time maintaining a desirable structural stability of the spacing element.

In one embodiment of the guided wave radar level gauge system, at least a portion of the probe may advantageously be arranged in a pipe. It may for example be desirable to arrange the probe in a pipe if the probe must curve around objects or if the probe must be inclined.

Accordingly, it may be advantageous that the plurality of spacing elements are arranged on the portion of the probe arranged in the pipe. And at least a portion of the aforementioned pipe may be curved.

In one embodiment of the invention, at least the portion of the probe arranged in the curved portion of the pipe may be flexible. Using a flexible probe, at least for portions of the probe to be arranged in a curved pipe, is advantageous as installation is simplified. A flexible probe may simply be inserted into and threaded through a curved pipe. Additional portions of the probe outside of the curved pipe may be either flexible or rigid.

According to one embodiment of the invention, the guided wave radar level gauge system may further comprise at least one locking element preventing longitudinal movement of the plurality of spacing elements in relation to the extension of the probe. It is generally desirable to prevent the spacing element from moving on the probe, either from moving downwards if only an upper portion of a probe is provided with spacing elements, or from moving upwards as a result of a rising level of the product in the tank. In particular, if only a portion of the probe is arranged in a curved pipe, and if only that portion comprises spacing element, it is desirable that the spacing elements are maintained in position so that the probe is prevented from making contact with the pipe in the curved portion.

According to one embodiment of the invention, the at least one locking element may advantageously be attached to said probe. However, the locking element may also be attached to the pipe in which a probe may be arranged.

In one embodiment of the invention, the spacing element is preferably made from a non-conductive material. In particular, if the probe is a transmission line probe, the spacing element is made from a non-conductive material to reduce the disturbance of a signal propagating on the probe caused by the spacing element.

According to one embodiment of the invention, a surface of the spacing element may advantageously be provided with a dirt-repellent coating. As any volume of material close to the probe may disturb the signal propagation on the probe, it is desirable that the product in the tank or other contaminants does not adhere to the spacing element. The amount of material sticking to the surface of the spacing element can be reduced by providing a non-adhesive coating on surfaces of the spacing element. In particular, both the inside and the outside of the spacing element may be coated with a non-adhesive material such as for example PTFE or other non-adhesive materials.

In one embodiment of the invention, the portion of the probe comprising the spacing elements may advantageously be arranged on a sloped surface. Thereby, it is possible to arrange the probe along the wall of a tank having a sloped wall, or the probe may be allowed to circumvent support structures or other obstacles in the tank.

According to one embodiment of the invention, at least one spacing element may advantageously be configured to reflect a predetermined portion of a signal propagating along said probe. By configuring at least one of the spacing elements arranged on the probe so that it also reflects a portion of a signal when the signal propagating on the probe reaches the spacing element, the spacing elements may be used as reference reflectors. A reflection of a signal propagating along the probe can be caused by a change in impedance in the surrounding of the probe. Thereby, the spacing element may be configured to cause an impedance transition in the vicinity of the probe. The use of reference reflectors arranged at known positions on the probe is known to the person skilled in the art, and reference reflectors may for example be used to improve the accuracy of the filling level determination. Using spacing elements as reference reflectors may further be combined with the use of dedicated locking elements for maintaining the reference reflectors in known positions along the probe.

According to a second aspect of the invention, there is provided spacing element comprising a shell structure having a substantially ellipsoidal shape defining an ellipsoidal space, a first and a second shell opening of a first diameter at a first and second location of the shell, respectively, such that a passage through the first and second shell opening defines a first passage through the ellipsoidal space, and a third and a fourth shell opening of a second diameter at a third and fourth location of the shell, respectively, such that a passage through the third and a fourth shell opening defines a second passage through the ellipsoidal space, wherein the second diameter is different from the first diameter, and a plurality of flow openings allowing fluid flow between the exterior and interior of the shell.

According to a third aspect of the invention, there is provided a method for arranging a probe in a radar level gauge system, the method comprising: providing a probe comprising a plurality of spacing elements arranged on a portion of the probe, each of the spacing elements comprising: a shell structure having a substantially ellipsoidal shape defining an ellipsoidal space, a first shell opening at a first location of the shell, a second shell opening at a second location, such that a passage through the first and second shell openings defines a passage through the spherical space, wherein the probe extends through the passage, and a plurality of flow openings allowing fluid flow between the exterior and interior of the shell, and arranging the portion of the probe comprising the spacing elements within a pipe such that the portion of the probe is prevented from contacting an inner wall of the pipe.

Effects and features of the second and third aspects of the present invention are largely analogous to those described above in connection with the first aspect of the invention.

BRIEF DESCRIPTION OF THE DRAWINGS

These and other aspects of the present invention will now be described in more detail, with reference to the appended drawings showing various exemplary embodiments of the invention, wherein.

DETAILED DESCRIPTION EXAMPLE EMBODIMENTS OF THE INVENTION

In the present detailed description, various embodiments of a guided wave radar level gauge system according to the present invention are mainly discussed with reference to a radar level gauge system having a single wire transmission line probe arranged in a pipe. It should be noted that this by no means limits the scope of the present invention which is equally applicable to other types of probes which may be arranged fully or partially within a pipe, or to probes arranged on an inclined surface, or to free-hanging probes without mechanical support.

Figure 1:
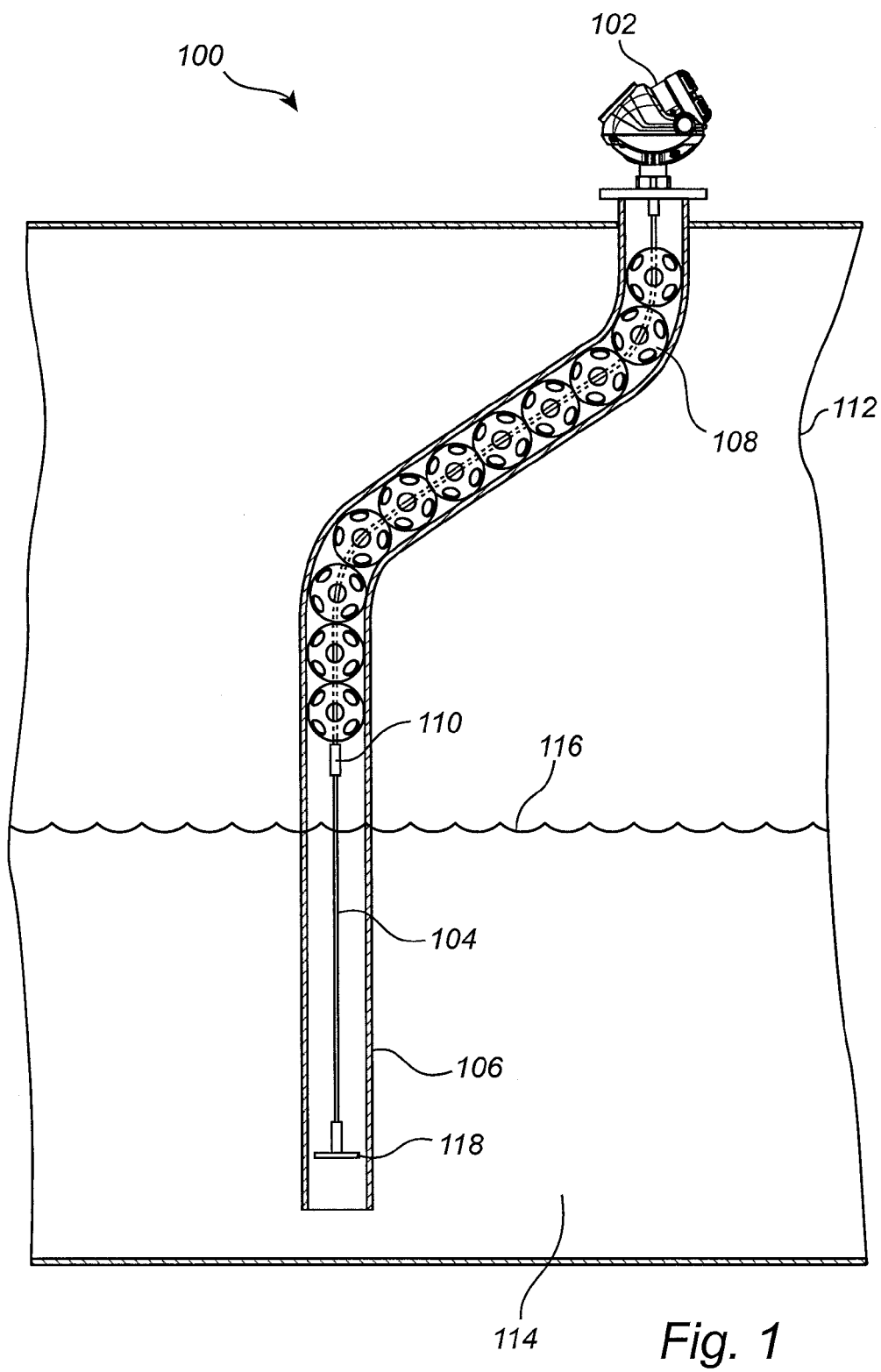
FIG. 1 schematically illustrates a guided wave radar level gauge system according to an embodiment of the invention.

FIG. 1 schematically illustrates a guided wave radar level gauge system 100 according to an embodiment of the present invention, comprising a measurement electronics unit 102 and a probe 104 arranged within a pipe 106. A plurality of spacing elements 108 are arranged on the probe 104. The spacing elements 108 are prevented from moving downward along the probe 104 by a locking element 110 arranged on the probe 104. The locking element 110 may be a clamp or a casing which is screwed onto or otherwise attached to the probe 104. Alternatively, a locking element may be attached to the inside of the pipe 106 or to the bottom of the pipe 106. The radar level gauge system 100 is provided on a tank 112, which is partly filled with a product 114 to be gauged. By analyzing electromagnetic transmission signals being guided by the probe 104 and corresponding reflected electromagnetic signals reflected at the surface 116 of the product, the filling level of the product can be determined. The probe 104 further comprises a bottom weight 118 for maintaining the probe 104 in position within the pipe 106 and to prevent vertical movement of the probe 104. Here, the probe 104 is illustrated as a single wire transmission line probe.

Figure 2:
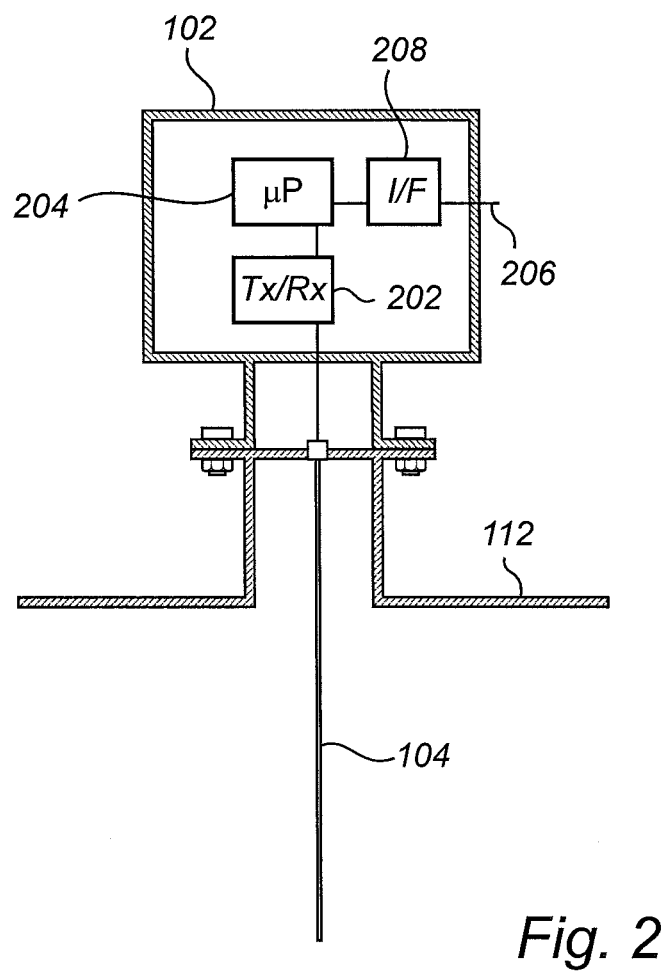
FIG. 2 is a block diagram of the radar module shown in FIG. 1.

As is schematically illustrated in FIG. 2, the electronics unit 102 comprises a transceiver 202 for transmitting and receiving electromagnetic signals, a processing unit 204, which is connected to the transceiver 202 for control of the transceiver 202 and processing of signals received by the transceiver 202 to determine the filling level of the product in the tank 112. The processing unit 204 is, furthermore, connectable to external communication lines 206 for analog and/or digital communication via an interface 208. Moreover, although not shown in FIG. 2, the radar level gauge system 100 is typically connectable to an external power source, or it may be powered through the external communication lines 206. Alternatively, the radar level gauge system 100 may be configured to communicate wirelessly.

FIGS. 3a-3f schematically illustrates spacing elements according to various embodiments of the present invention.

Figure 3A:
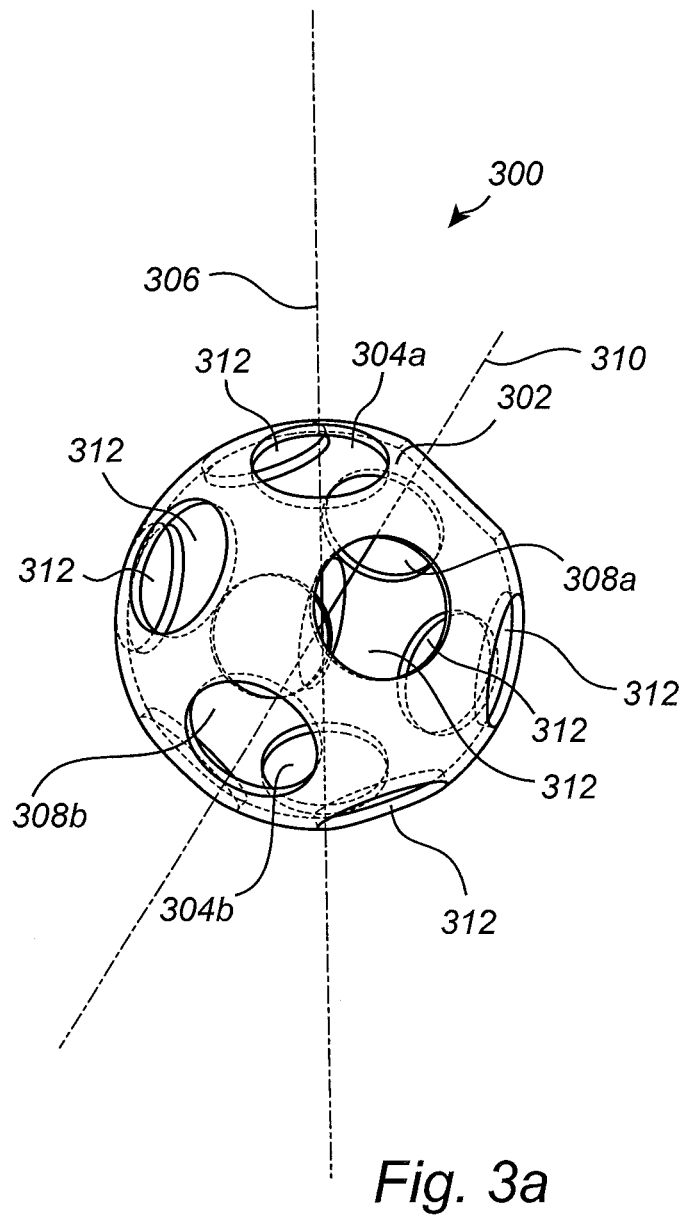
FIGS. 3 a-f schematically illustrates spacing elements according to various embodiments of the invention.

FIG. 3a illustrates a spacing element having a spherical shell structure 302. The shell 302 comprises a first pair of openings 304 a-b defining a first passage 306 through the shell 302 and a second pair of openings 308 a-b defining a second passage through the shell 302. Both passages run through the center of the spherical space defined by the shell 302. The shell 302 also comprises a plurality of flow openings 312 which allow fluid to flow through the spacing element 300, and which allow the product 114 in the tank 112 to be in contact with the probe 104.

Figure 3B:
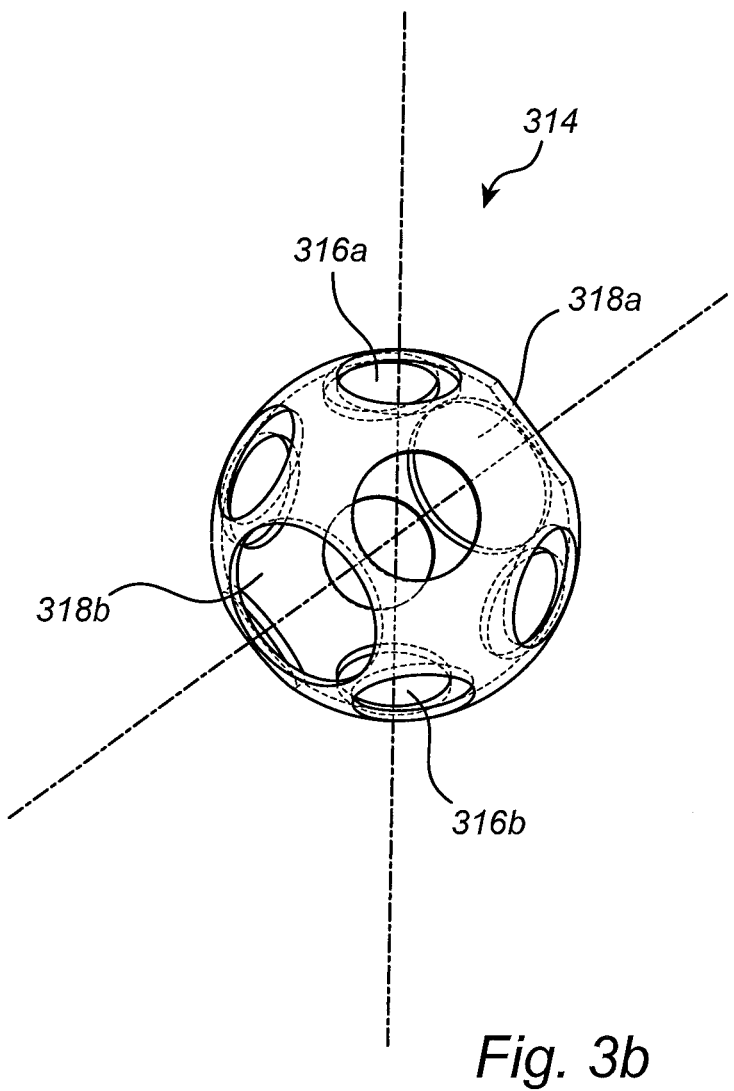

In FIG. 3b, the spacing element 314 comprises a first pair of shell openings 316 a-b having a first diameter and a second pair of shell openings 318 a-b having a second diameter. Thereby, by providing a spacing element with openings of different diameters, the spacing element may be used together with different types of probes having different diameters.

Figure 3C:
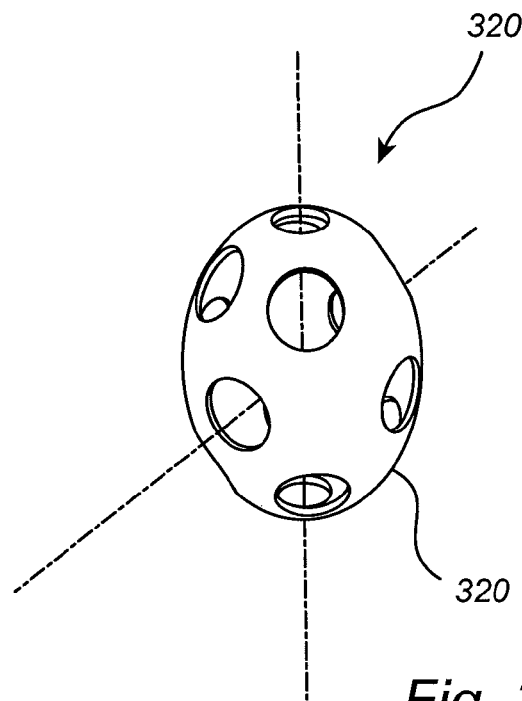

FIG. 3c illustrates a spacing element 320 having an ellipsoidal shell structure 322. In a similar manner as described above in relation to FIG. 3b, the ellipsoidal spacing element 320 comprises a first pair of shell openings 321 a-b having a first diameter and a second pair of shell openings 323 a-b having a second diameter. By providing two pairs of shell openings in the ellipsoidal shell 322, the spacing element 320 may be used in pipes of different diameter.

Figure 3D:
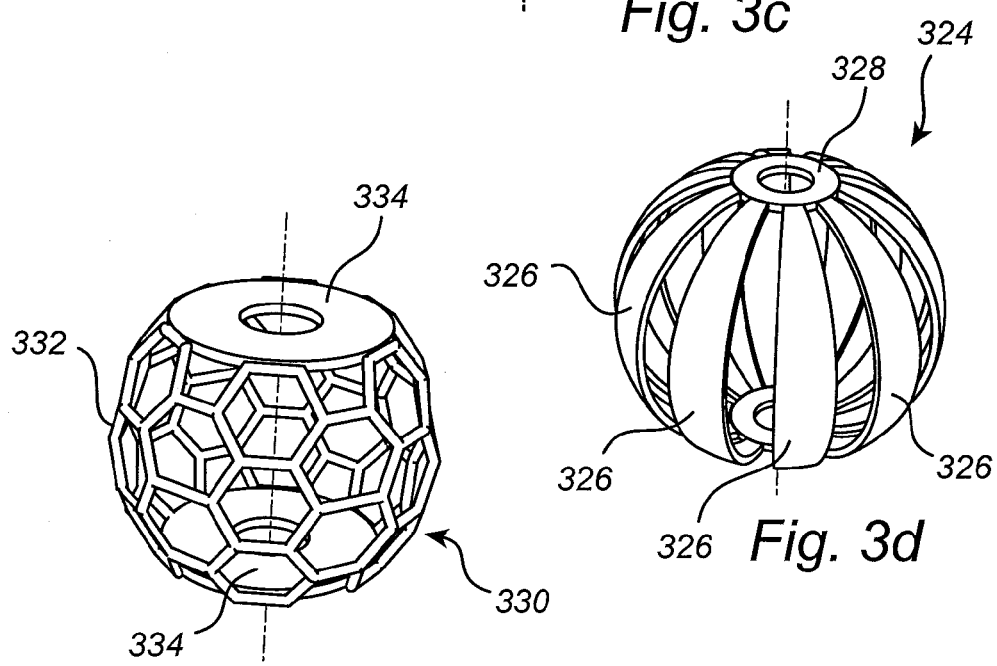

In FIG. 3d, a substantially spherical spacing element 324 is illustrated formed by a plurality of strips 326 joined together by rings 328 located at each of the poles of the spherical spacing element 324. Here, the flow openings are defined as the space between the strips 326, and a fluid is thus free to flow through the spacing element 324.

Figure 3E:
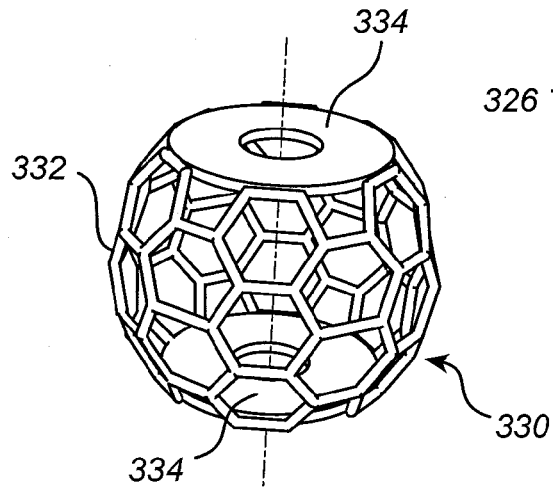

FIG. 3e illustrates a spacing element where the substantially spherical shell is formed by a mesh structure 332 held together by rings 334 at the poles of the spherical shell in a similar manner as in FIG. 3d. It is readily realized by the person skilled in the art that any type of mesh or similar configuration may be used as long as the spacing element has sufficient structural stability and as long as a fluid may flow through the element.

Figure 3F:
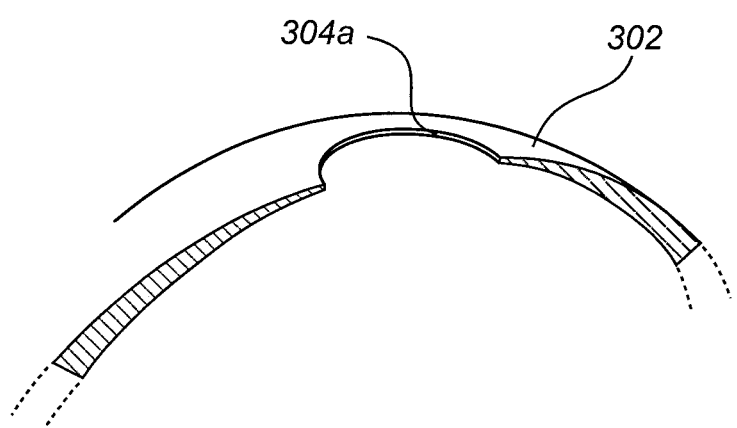

FIG. 3f illustrates a cross section of a spacing element where the shell 302 is tapered towards the opening 304a through which the probe will run. By tapering the shell 302 so that it is thinner closer to the probe 104, the electrical influence of the spacing element on the propagation properties of a signal propagating on the probe is further reduced.

For example, the portion of the shell of the spacing element in contact with or close to the probe may be made thinner than the rest of the shell, such as for example 1 mm thick, so that the amount of mass close to the probe is reduced as much as possible.

The spacing element is preferably made from a material with a relatively low dielectric constant to reduce the impedance of the spacing element as seen by a signal propagating along the probe. Suitable materials may include plastic materials and ceramics. In particular, for low temperatures fluorine based plastic materials may be suitable.

Furthermore, the spacing element described herein may also be used in a flexible coaxial probe to maintain a constant distance between the inner conductor and the outer conductor.

Additionally, a probe comprising pre-arranged spacing elements may be provided in multiple sections which can be joined together when installing the probe in a tank. Thereby, both transport and installation can be simplified as it is not required to handle a probe equal to the height of the tank.

Furthermore, a more flexible radar level gauge system can be provided as the length of the probe readily can be adjusted by removing or adding sections.

Figure 4A:
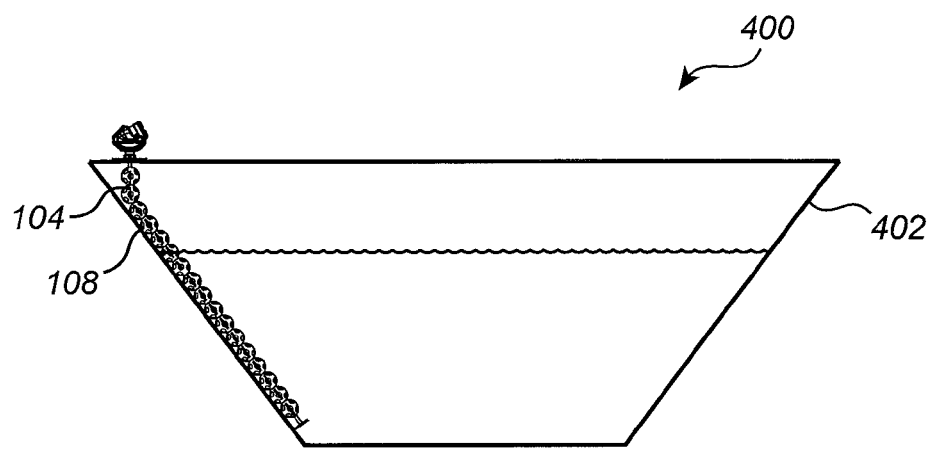
FIGS. 4 a-b schematically illustrates a guided wave radar level gauge system according to embodiments of the invention.

FIG. 4a schematically illustrates a guided wave radar level gauge system 400 arranged in a tank 402 having a sloped wall. The probe 104 comprising spacing elements 108 may then run along the wall of the tank.

Figure 4B:
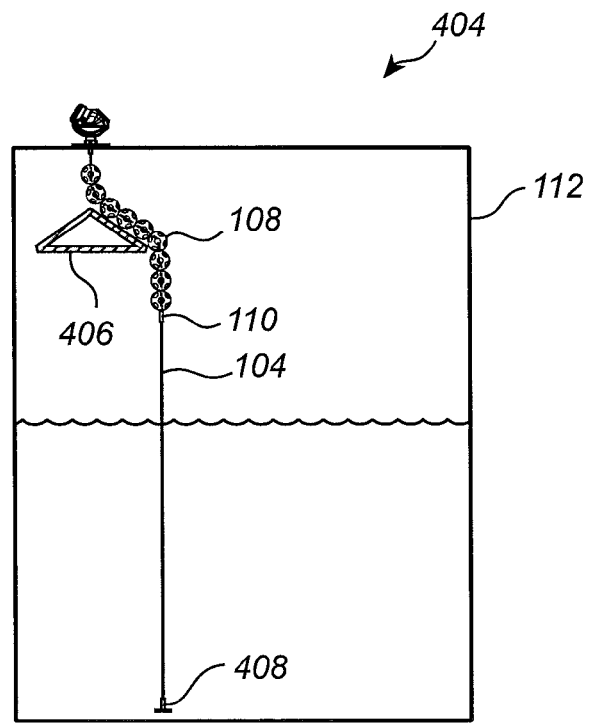

FIG. 4b schematically illustrates a guided wave radar level gauge system 404 arranged in a tank 112 where an obstacle 406, for example in the form of a support beam, is located directly under the tank opening. In such an arrangement, a probe 104 may be provided with spacing elements 108 in order to avoid contact between the probe 104 and the obstacle 406 as the probe 104 pass the obstacle 406. The probe 104 is kept in place by a weight 408 arranged at the lower end of the probe 104.

Even though the invention has been described with reference to specific exemplifying embodiments thereof, many different alterations, modifications and the like will become apparent for those skilled in the art. For example, many different types of spacing elements may be used. The spacing element may also be used at an advantage in applications not specifically disclosed. Also, it should be noted that parts of the system may be omitted, interchanged or arranged in various ways, the radar level gauge system yet being able to perform the functionality of the present invention.

What is claimed is:

1. A guided wave radar level gauge system for determining a filling level of a product contained in a tank, which level gauge system comprises:
    a transceiver for transmitting electromagnetic transmission signals and receiving reflected electromagnetic signals reflected at a surface of said product;
    a probe, connected to said transceiver, arranged to extend vertically into said tank and configured to guide said electromagnetic transmission signals towards said surface and to guide said reflected electromagnetic signals back to said transceiver;
    processing circuitry connected to said transceiver and configured to determine said filing level based on said received reflected electromagnetic signals; and
    a plurality of spacing elements arranged on said probe, each of said spacing elements comprising:
    a shell structure having a substantially ellipsoidal shape defining an ellipsoidal space;
    a first shell opening at a first location of said shell;
    a second shell opening at a second location, such that a passage through said first and second shell openings defines a passage through said spherical space, wherein said probe extends through said passage; and
    a plurality of flow openings allowing fluid flow between the exterior and interior of said shell.

2. The guided wave radar level gauge system according to claim 1, wherein each of said spacing elements further comprises:
    a third shell opening at a third location of said shell;
    a fourth shell opening at a fourth location of said shell, such that a passage through said third and fourth shell openings defines a second passage through said spherical space, wherein said third and fourth shell openings are of a different diameter than said first and second shell openings.

3. The guided wave radar level gauge system according to claim 1, wherein said shell structure has a substantially spherical shape defining a spherical space.

4. The guided wave radar level gauge system according to claim 3, wherein said first shell opening is arranged antipodal to said second shell opening, such that said passage through said spherical space defines a central axis of said spherical space.

5. The guided wave radar level gauge system according to claim 3, wherein shell openings located antipodal to each other are of the same diameter.

6. The guided wave radar level gauge system according to claim 1, wherein said shell is tapered towards each of said shell openings so that a portion of said shell adjacent to each of said shell openings is thinner than portions distant from said shell openings.

7. The guided wave radar level gauge system according to claim 1, wherein at least a portion of said probe is arranged in a pipe.

8. The guided wave radar level gauge system according to claim 7, wherein said plurality of spacing elements are arranged on said portion of said probe arranged in said pipe.

9. The guided wave radar level gauge system according to claim 8, wherein at least a portion of said pipe is curved.

10. The guided wave radar level gauge system according to claim 9, wherein at least said portion of said probe arranged in said curved portion of said pipe is flexible.

11. The guided wave radar level gauge system according to claim 1, further comprising at least one locking element preventing longitudinal movement of said plurality of spacing elements in relation to the extension of said probe.

12. The guided wave radar level gauge system according to claim 11, wherein said at least one locking element is attached to said probe.

13. The guided wave radar level gauge system according to claim 1, wherein said spacing element is made from a non-conductive material.

14. The guided wave radar level gauge system according to claim 1, wherein a surface of said spacing element is provided with a dirt-repellent coating.

15. The guided wave radar level gauge system according to claim 1, wherein a portion of said probe comprising said spacing elements is arranged on a sloped surface.

16. The guided wave radar level gauge system according to claim 1, wherein at least one spacing element is configured to reflect a predetermined portion of a signal propagating along said probe.

17. A spacing element for a probe in a radar level gauge system, said spacing element comprising:

a shell structure having a substantially ellipsoidal shape defining an ellipsoidal space;
  a first and a second shell opening of a first diameter at a first and second location of said shell, respectively, such that a passage through said first and second shell opening defines a first passage through said ellipsoidal space; and
  a third and a fourth shell opening of a second diameter at a third and fourth location of said shell, respectively, such that a passage through said third and a fourth shell opening defines a second passage through said ellipsoidal space, wherein said second diameter is different from said first diameter; and
  a plurality of flow openings allowing fluid flow between the exterior and interior of said shell.

18. A method for arranging a probe in a radar level gauge system, said method comprising:

providing a probe comprising a plurality of spacing elements arranged on a portion of said probe, each of said spacing elements comprising:
    a shell structure having a substantially ellipsoidal shape defining an ellipsoidal space;
    a first shell opening at a first location of said shell;
    a second shell opening at a second location, such that a passage through said first and second shell openings defines a passage through said spherical space, wherein said probe extends through said passage; and
    a plurality of flow openings allowing fluid flow between the exterior and interior of said shell; and
  arranging said portion of said probe comprising said spacing elements within a pipe such that said portion of said probe is prevented from contacting an inner wall of said pipe.

* * * * *